United States Patent [19]
Hayakawa

[11] Patent Number: 5,435,894
[45] Date of Patent: Jul. 25, 1995

[54] PROCESS AND APPARATUS FOR IMPROVING QUALITY OF WATER

[76] Inventor: Hideo Hayakawa, 2656-12, Moriya-ko, Moriya-machi, Kita-soma-gun, Ibaraki-ken, Japan

[21] Appl. No.: 200,692

[22] Filed: Feb. 23, 1994

[30] Foreign Application Priority Data

Feb. 26, 1993 [JP] Japan .................. 5-063248

[51] Int. Cl.$^6$ ............................. C02F 1/461
[52] U.S. Cl. ............... 204/149; 204/222; 204/231; 210/748
[58] Field of Search .............. 204/149, 231, 228; 210/748

[56] References Cited

U.S. PATENT DOCUMENTS

| | | | |
|---|---|---|---|
| 3,627,648 | 12/1971 | Waggener | 204/231 |
| 5,071,532 | 12/1991 | Taillet et al. | 204/228 |
| 5,326,446 | 7/1994 | Binger | 204/149 |

FOREIGN PATENT DOCUMENTS 61-101296 5/1986 Japan .
1-317592 12/1989 Japan .
4-277076 10/1992 Japan .

*Primary Examiner*—John Niebling
*Assistant Examiner*—Arun S. Phasge
*Attorney, Agent, or Firm*—Nikaido, Marmelstein, Murray & Oram

[57] ABSTRACT

The invention provides a process and apparatus for improving the quality of water in an easy manner and with reasonable cost and high efficiency. The process provides a grounding electrode and a pair of applying electrodes in water to be treated. First and second high-frequency switches are connected respectively to a DC voltages source through a variable resistor. A switching commander circuit, which is a flip-flop circuit, is connected to the first and second switches through a resistor. An oscillator is connected to the switching commander circuit. The switching commander circuit alternately outputs a switching command to the first and second switches, in response to a signal from the oscillator, so that the first and second switches are periodically turned ON and OFF resulting in voltage being alternately applied to the pair of applying electrodes which causes an ORP value of the water to decrease.

6 Claims, 4 Drawing Sheets

PROCESS AND APPARATUS FOR IMPROVING QUALITY OF WATER

BACKGROUND OF THE INVENTION

1. Field of the Invention

The present invention relates to a process and apparatus for improving the quality of water by applying electrical energy thereto without using activated carbon, a filter, chemicals or the like. The process and apparatus are suitable for improving the taste of drinking water such as well water and city water.

Nowadays, a source of a water supply has been contaminated by an increase of waste water from houses due to popularization of flush toilets and bathes, discharge of various chemicals including detergents, increase of water in industrial use, discharge of various waste water, use of various chemical fertilizers and agricultural chemicals, so that the quality of well water and city water remarkably decreases. Therefor, there is a strong demand for the supply of drinking water to be safe and taste good.

2. Description of Related Art

As quality of modified water, hitherto, alkali-ionized water has been known. This water can be obtained by feeding water into an electrolytic cell partitioned by a diaphragm into an anode and cathode chambers to apply DC voltage between an anode and cathode in the chambers for causing a certain kind of electrolysis. An electrolyte such as NaCl or the like may be added to the water to increase an electric conductivity.

An alkaline water formed in the cathode chamber has been utilized as drinking water [Japanese Patent 61-101296(A) and 4-277076(A)], and an acidic water formed in the anode chamber has been utilized for sterilization purposes [Japanese Patent 1-317592(A)].

In such a conventional water treating process and apparatus, one of the electrodes is used as one with positive polarity, whereas the other with negative polarity, and therefore, the electrodes are gradually covered with matters deposited thereon through the treatment, thereby preventing transfer of electricity therebetween. For preventing the deposition, there is a way to periodically change the polarity of DC voltage to be applied to the electrodes.

With the mere periodic change of polarity in DC voltage, however, various and different requirements depending on usage of water can not be satisfied and sufficient effect can not be obtained by a single apparatus. Further, the periodic change of polarity requires an extra constant-voltage circuit, low current circuit, polarity reverse circuit and others which increase the cost therefor.

The conventional process utilizes the certain electrolysis which is unsuitable for treating a large amount of water, and in which solubility of minerals decreases, as pH of the water becomes 9-10. There are such disadvantages that the alkali-ionized drinking water has a bad effect on persons with hypersensitiveness such as atopic diseases, pollinosis and others.

In view of above state of the art, the invention has energetically studied and investigated to find that various items on pollution, for instance, turbidity, smell, amount of dissolved oxygen, chemical oxygen demand (COD), concentration of phosphate and others can be improved, that cohesion and precipitation of organic matters suspended and/or dissolved in water occur, and that solubility of minerals increases, by decreasing oxidation-reduction potential (ORP) of the water through an electrical treatment which causes no substantial change in pH, to establish the invention.

SUMMARY OF THE INVENTION

Objects of the invention are to provide a process and apparatus for improving the quality of water, which provides water for drinking and other purposes with easy, reasonable cost and good efficiency.

The objects can be attained by a process for improving the quality of water, comprising the steps of providing a ground electrode and a pair of applying electrodes in water to be treated, and providing a DC voltage source, first and second high-frequency switches connected respectively to the DC voltage source through a variable resistor. A high-frequency switching commander circuit, which is a flip-flop circuit, is connected to the high-frequency switches through a resistor, and a high-frequency oscillator is connected to the high-frequency switching commander circuit, wherein the high-frequency switching commander circuit alternately outputs a high-frequency switching command to the first and second high-frequency switches, in responce to a high-frequency signal from the high-frequency oscillator, so that the first and second high-frequency switches are high periodically turned ON and OFF and the resulting high-frequency voltage is alternately applied for the pair of applying electrodes to decrease ORP value of the water.

A level of the signal output from the high-frequency oscillator to the high-frequency switching commander circuit is preferable from the view point of safety within a range of 20-50 KHz and 10-50 V, and a specified frequency and voltage shall be selected within the ranges, in response to the quality of water to be treated. The material of the applying electrodes is selected by taking the quality of water to be treated into consideration. As the material, zinc, lithium oxide, magnesium alloys (with zinc), copper, iron, stainless-steel, titanium or the like can be listed, but zinc and magnesium alloys are preferable for obtaining drinking water, since the electrode made by such materials gradually dissolves to enrich the water in its mineral content.

The period of time required for treating the water is different depending on electric resistance of the water. In general, city water has a higher electric resistance, namely it requires about 2-3 hours for decreasing ORP value from about 500 mV to about 100 mV, but water from a river, a lake and a marsh shows a tendency in which ORP decreases in a shorter period of time.

When the AC voltage is alternately applied to the pair of applying electrodes according to the manner described above, almost all organic matters in the water shall be decomposed and gasified and a part thereof is cohered and precipitated. It is preferable for the drinking water to have ORP value of about 100 mV more or less, which riches in ability for dissolving minerals. The resulting quality improved water is also suitable for vegetables, for instance the same filling a flower vase, used for a garden plant and the like. For drinking water, it is preferable to put into a tank pieces of a stone rich in mineral content which gradually dissolves in the water, as ORP value of the water decreases.

There is no reliable means for verifying phenomena at a molecular level, such as a structural change of water molecule and the like, in the water by applying a high-frequency AC voltage thereto, but effect of improvement can be confirmed by measuring a turbidity, smell, amount of dissolved oxygen, COD and concentration of phosphate as indexes for clarification and modification of water quality. According to the process of the invention, a remarkable improvement is attained in each of the items as stated later.

The electric source for the apparatus may be of an electric cell or battery, or the apparatus can be connected to a plug socket through an adapter, so that the process according to the invention can be carried out any place.

When the grounding electrode is arranges as a pair electrodes for alternately grounding with a low cycle, an adhesion of foreign matters thereon can be effectively avoided to make possible a long time continuous operation.

DESCRIPTION OF THE PREFERRED EMBODIMENTS

A process and apparatus for improving the quality of water according to the invention will now be further explained in more detail with reference to the drawings.

Figure 1:
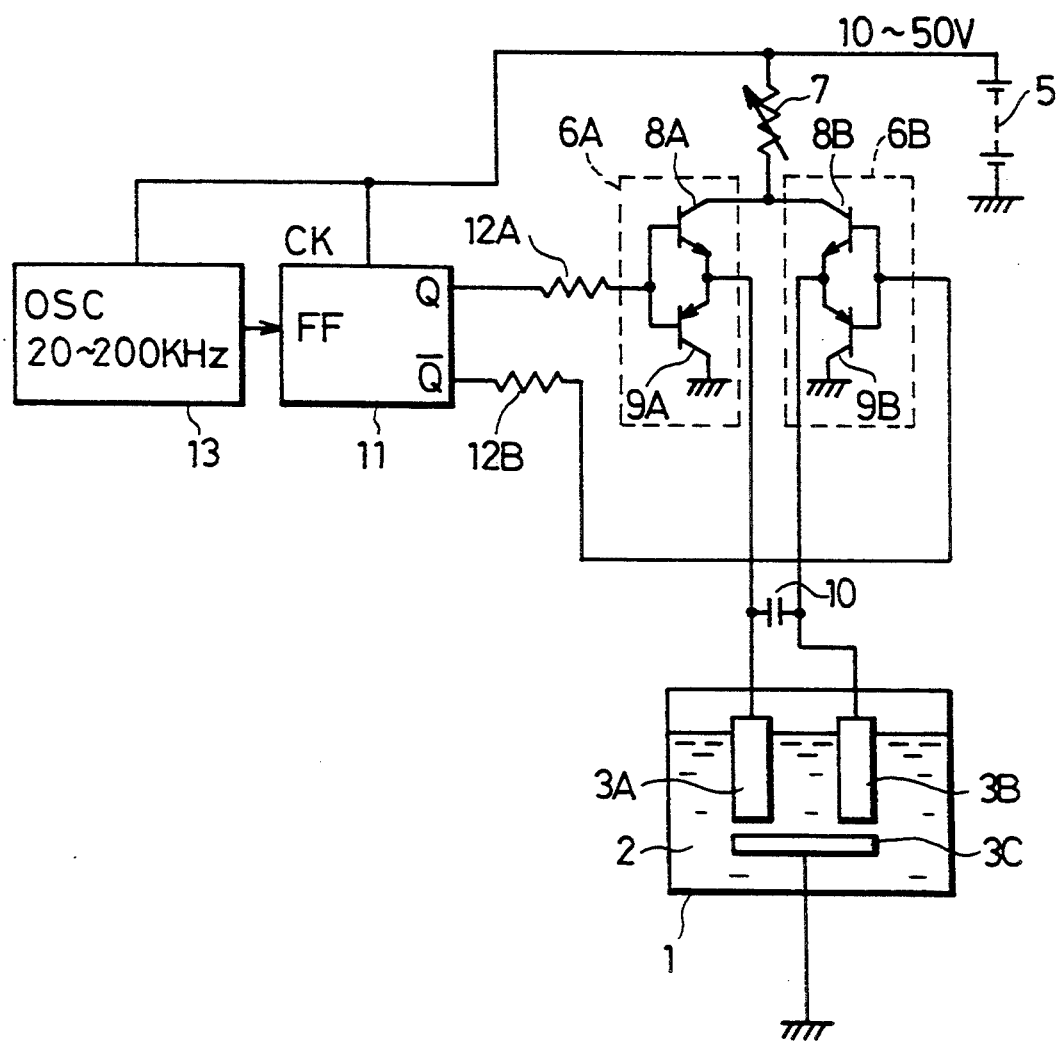
FIG. 1 is a circuit diagram for an apparatus according to the invention.

In FIG. 1 showing mainly a circuit diagram of the apparatus, a grounding electrode 3C and a pair of applying electrodes 3A, 3B are arranged in a tank 1 which accommodates water 2 to be treated. In this embodiment, a stainless-steel plate and zinc plates are selected for the grounding electrode and applying electrodes, respectively, but other materials such as lithium oxide, magnesium alloy, copper, iron, titanium and the like may be used based upon the quality of water to be treated, usage of the treated water and other factors.

First and second high-frequency switches 6A and 6B are connected between the applying electrodes 3A, 3B and a DC source 5 through a variable resistor 7, to convert DC voltage, from the DC source 5, to high-frequency AC voltage which is output to the applying electrodes 3A and 3B alternately. The first and second high-frequency switches 6A, 6B have transistors 8A, 9A and 8B, 9B, respectively. The applying electrodes 3A and 3B are connected through a capacitor 10. Voltage is adjusted by the variable resistor 7 in a range of 10–50 V, in response to the quality of water to be treated.

To the first and second high-frequency switches 6A and 6B, a high-frequency switching commander circuit 11, consisting of a flip-flop circuit, is connected through resistors 12A, 12B for applying a high-frequency switching command to the switches 6A and 6B. A high-frequency oscillator 13 is connected to the circuit 11 for outputting a signal of 20–200 KHz high-frequency to the circuit 11.

Figure 2:
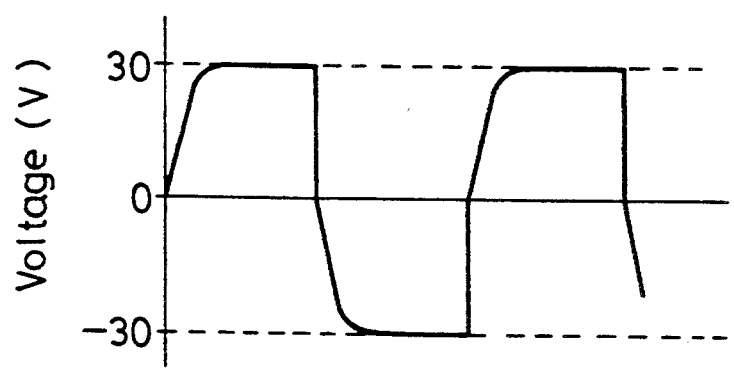
FIG. 2 shows a waveform of high-frequency AC voltage to be supplied to an applying electrode.
Figure 3:
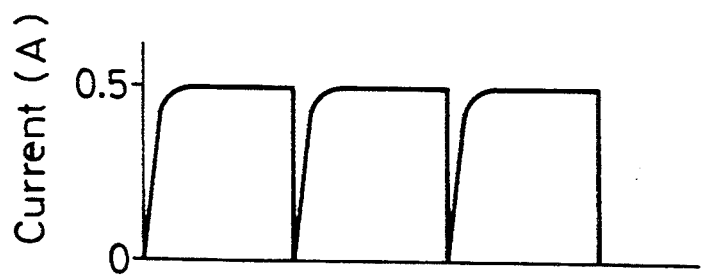
FIG. 3 shows a waveform of DC current appearing at a grounding electrode.

In operation, a switch (not shown) is turned ON, after filling the tank 1 with water to be treated, such as city water, and setting a timer (not shown) to be predetermined period of time. When the high-frequency signal from the high-frequency oscillator 13 is output to the high-frequency switching commander circuit 11, the circuit 11 issues the high-frequency command to alternately output the same to the first and second high-frequency switches 6A, 6B which convert the DC voltage from the DC source 5 to a high-frequency AC voltage by its high periodic ON-OFF switching and the resulting high-frequency AC voltage is alternately applied to the pair of applying electrodes 3A, 3B in the tank 1. A waveform of the AC voltage to be transmitted to each of the applying electrodes 3A, 3B is shown in FIG. 2. The height of voltage wave is determined by a value of resistance pre-set for the variable resistor 7. A form of waves of DC current as shown in FIG. 3 was observed between the applying electrode 3A or 3B and the grounding electrode 3C. The form of the waves may be determined according to the capacitance of the capacitor 10 provided within the applying electrodes 3A and 3B. Such rectangular waves in FIG. 3 are obtained at the capacitance 203 $\mu$F which is most effective to decrease an ORP value of water in this embodiment.

Figure 4:
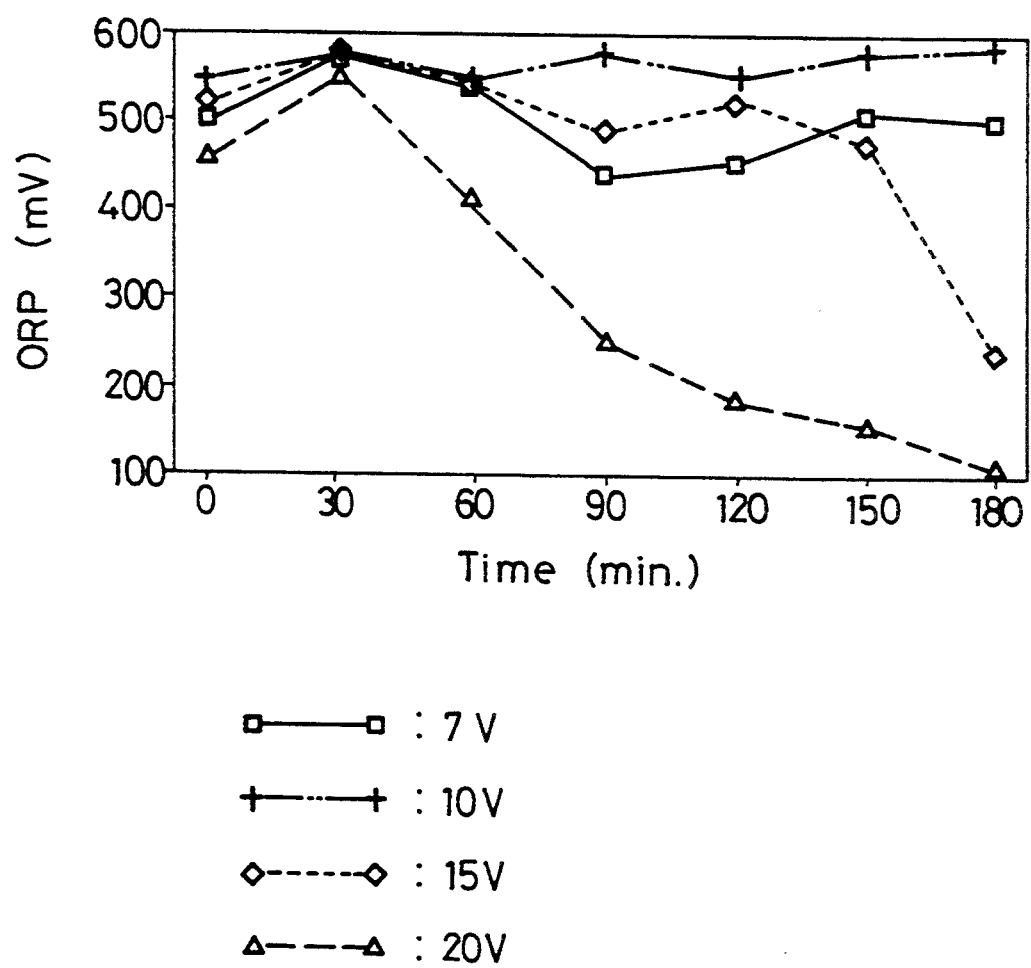
FIG. 4 is a graph showing a relation of applied voltage, oxidation-reduction potential, and voltage applying period of time.

A relation between change in ORP value of the city water and applying period of time was checked. Results are shown in FIG. 4. It can be seen from FIG. 4, the ORP decrease, as applying voltage is set at a higher level and the applying period of time is made longer.

A slightly contaminated water, taken from a marsh of Tega-numa in Chiba-ken, Japan was treated by the apparatus as shown in FIG. 1 under the voltage 30 V. Results are shown in the following Table 1 which makes apparent how the ORP of water changed with time, and how the water improved in quality.

TABLE 1

| Time | ORP (mV) | Smell | Visual appearance |
|---|---|---|---|
| untreated | 330 | fairly bad | |
| 5 min. | 220 | detectable | organic matters are seen by eyesight |
| 10 min. | −346 | hardly detectable | deposition of organic and inorganic matters noted |
| 15 min. | −600 | no bad smell | deposition increased |
| 18 hours. after the treatment | −300 | no bad smell | as clear as city water (height of deposition 7 mm) |

When results shown in Table 1 and the graph in FIG. 4 are compared, it is apparent that the time required for decreasing the ORP value is remarkably different based upon the water to be treated. The difference should be caused mainly by a difference in electric resistance of the water. Namely, the contaminated marsh water as in Table 1 contains various foreign matters therein to show a lower electric resistance, but a content of foreign matters in the city water as in FIG. 4 is relatively low to show a higher electric resistance.

At any rate, it has been confirmed that the decrease of ORP value can be made an index on quality modification or improvement of the water.

Measurements on various items were carried out using the contaminated marsh water as in the above and then the water was treated for 15 minutes by the apparatus as shown in FIG. 1. The treated water was left to stand for 18 hours in the tank and measurements on the same items was carried out. Results are shown in the following Table 2 .

TABLE 2

| Items | Before | After | Notes |
|---|---|---|---|
| turbidity | 25° | 2° | measured by turbidity gauge PC-06, Kyoto Denshi Kogyo |
| smell | corrupted algae-like smell | no smell | |
| electric conductivity | 340 mho/cm | 231 mho/cm | Yokogawa, SC82 Type |
| oxygen content | 9.1 ppm | 11.75 ppm | |
| pH | 8.786 | 7.6 | |
| ORP | 300 mV | −300 mV | Toukou Kagaku Kenkyusho, TRX-90 Type |
| COD | 50 ppm | 10 ppm | Central Kagaku HC-407 |
| phosphate | 0.9 ppm | 0.05 ppm | Kyoritsu Kagaku Kenkyusho, F-Type |

As apparent from the above, the water treating process according to the invention shows improvements in all items.

Figure 5:
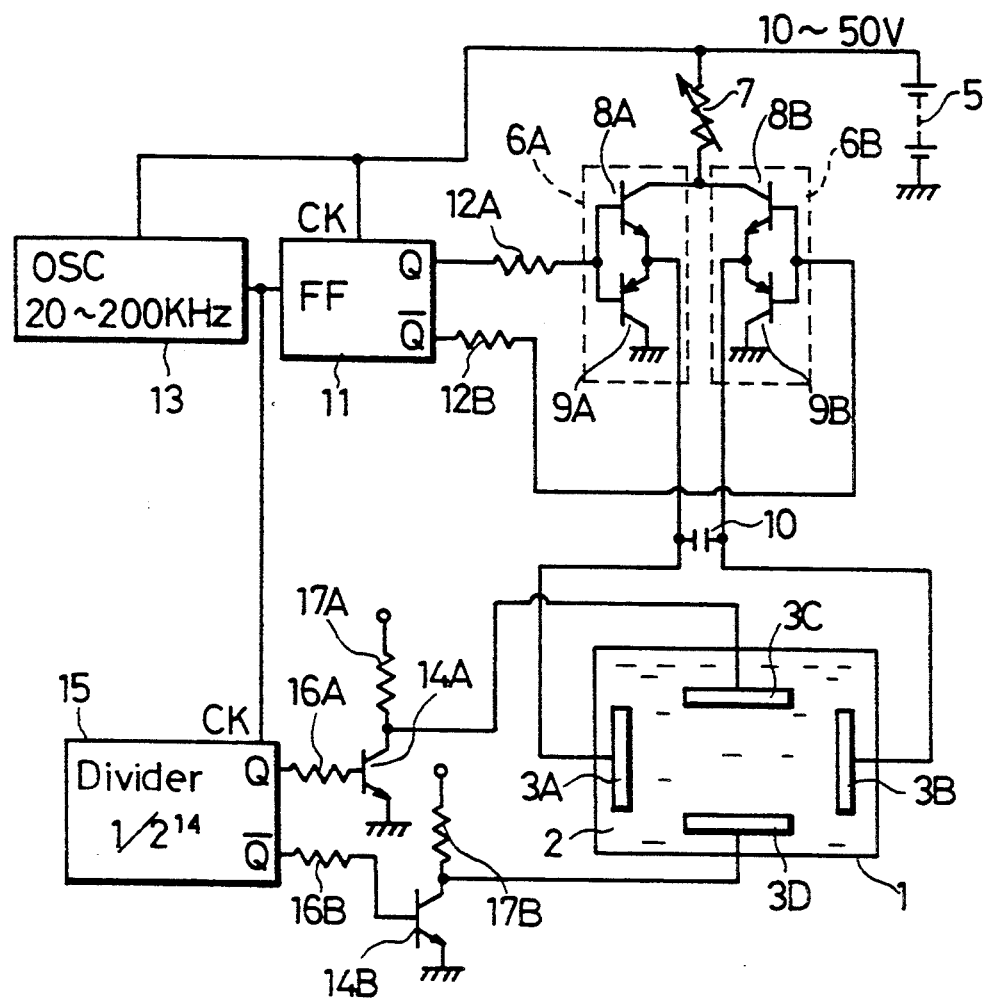
FIG. 5 is another circuit diagram for a second embodiment of the apparatus.

FIG. 5 shows another embodiment for carrying out the process of the invention. The embodiment is substantially the same as the fist embodiment shown in FIG. 1, except that two grounding electrodes are provided and a low-frequency switching circuit for alternately grounding one of the electrodes with a low cycle are also provided. Therefore, the same reference numerals or symbols are given for identical parts and an overlapping explanation is not given.

In the embodiment, low-frequency switches 14A, 14B are connected to the pair of oppositely arranged rounding electrodes 3C, 3D to alternately ground one of the electrodes with a low cycle. The low-frequency switches 14A, 14B are connected to a low-frequency switching commander circuit 15 through resistors 16A, 16B. The low-frequency commander circuit 15 is a frequency divider to divide a 20-200 KHz signal from the high-frequency oscillator 13 to $\frac{1}{4}^{14}$ for outputting the divided signal to the low-frequency switches 14A, 14B.

Resistors 17A, 17B, connected to the low-frequency switches 14A, 14B, connect a collector of the low-frequency switch to the positive side of the DC source to keep the grounding electrode 3C, 3D at a positive potential at switching-off time.

As explained as above, the quality of the water can be improved by the process according to the invention with a simple apparatus and reasonable cost. The invention can be applied for supplying water for industrial use, in addition to water for drinking and plant cultivation and other purposes. Further, the apparatus according to the invention may be operated with an electric cell or battery, so that it can easily be moved in order to use the same in various places.

I claim:

1. A process for improving quality of water, comprising the steps of:
   providing a grounding electrode and a pair of applying electrodes in water to be treated;
   connecting first and second switches respectively to a DC voltage source through a variable resistor;
   connecting a switching commander circuit which is a flip-flop circuit to the switches through a resistor; and
   connecting a oscillator to the switching commander circuit, wherein the switching commander circuit alternately outputs a switching command to the first and second switches, in response to a signal from the oscillator, so that the first and second switches are periodically turned ON and OFF resulting in voltage being alternately applied to the pair of applying electrodes which causes an ORP value of the water to decrease.

2. A process as claimed in claim 1, wherein said electrode is made of materials selected from the group consisting of zinc, lithium oxide, magnesium alloy, copper, iron, stainless-steel and titanium.

3. A process as claimed in claim 1, wherein said grounding electrode is arranged as a pair of electrodes opposing each other and alternately grounded.

4. A process as claimed in claim 1, wherein said DC source supplies 10–50 V and said oscillator outputs to said switching commander circuit a signal of 20–200 KHz.

5. An apparatus for improving quality of water, comprising:
   a tank;
   a grounding electrode;
   a pair of applying electrodes, wherein all of said electrodes being arranged in said tank;
   a DC source;
   first and second switches, each being connected to said DC source through a variable resistor to convert the DC voltage from said DC source to AC voltage for alternately applying the AC voltage to one of said applying electrodes;
   a switching commander circuit which is a flip-flop circuit connected to said switches through a resistor for outputting a switching command; and
   a oscillator outputting a signal to said switching commander circuit.

6. An apparatus as claimed in claim 5, wherein two electrodes opposed to each other are arranged as said grounding electrode, each electrode being connected to a third and fourth switches which are connected to said oscillator through a second switching commander circuit, wherein said two grounding electrodes are alternately grounded.

* * * * *